United States Patent
Mohammed et al.

(10) Patent No.: US 12,219,061 B2
(45) Date of Patent: Feb. 4, 2025

(54) METHOD AND SYSTEM FOR TOKEN GATEWAY

(71) Applicant: Visa International Service Association, San Francisco, CA (US)

(72) Inventors: Sayeed Mohammed, Foster City, CA (US); Alan Johnson, Herriman, UT (US); Sheldon Banow, Castro Valley, CA (US); Fouad Rabhi, Amsterdam (NL); Laszlo Spoor, Krimpen aan den Ijssel (NL); Mohammed Chakib Bouda, San Francisco, CA (US); Rahmat Adnan, San Francisco, CA (US); Arvind Santhanaraman, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 309 days.

(21) Appl. No.: 17/787,162

(22) PCT Filed: Dec. 21, 2020

(86) PCT No.: PCT/US2020/066462
§ 371 (c)(1),
(2) Date: Jun. 17, 2022

(87) PCT Pub. No.: WO2021/127652
PCT Pub. Date: Jun. 24, 2021

(65) Prior Publication Data
US 2023/0035507 A1 Feb. 2, 2023

Related U.S. Application Data

(60) Provisional application No. 62/969,454, filed on Feb. 3, 2020, provisional application No. 62/951,997, filed on Dec. 20, 2019.

(51) Int. Cl.
H04L 9/32 (2006.01)

(52) U.S. Cl.
CPC .................................. H04L 9/3213 (2013.01)

(58) Field of Classification Search
CPC . H04L 9/3213; H04L 67/567; H04L 2209/56; H04L 2463/102; H04L 63/0807
(Continued)

(56) References Cited

U.S. PATENT DOCUMENTS

| 10,361,856 B2 | 7/2019 | Cassin et al. |
| 2013/0086141 A1* | 4/2013 | Saldhana ............ H04L 63/0815 709/203 |

(Continued)

FOREIGN PATENT DOCUMENTS

| CN | 105874495 A | 8/2016 |
| CN | 108604989 A | 9/2018 |

(Continued)

OTHER PUBLICATIONS

Application No. EP20902443.9, Extended European Search Report, Mailed on Jan. 4, 2023, 8 pages.
(Continued)

*Primary Examiner* — Kambiz Zand
*Assistant Examiner* — Aubrey H Wyszynski
(74) *Attorney, Agent, or Firm* — Kilpatrick Townsend & Stockton LLP

(57) ABSTRACT

A method is disclosed. The method includes receiving, by a token gateway, a first request message from a token requestor computer. The token gateway determines at least one token service computer from a plurality of token service computers, each token service computer in the plurality of token service computers operating independently of each other. The token gateway transmits at least one second request message to the at least one token service computer
(Continued)

and receives, at least one first response message comprising at least one token and/or supplemental data associated with the at least one token from the at least one token service computer. The token gateway transmits a second response message to the token requestor computer, the second response message comprising the at least one token and/or the supplemental data.

18 Claims, 5 Drawing Sheets

(58) Field of Classification Search
USPC .......................................................... 713/153
See application file for complete search history.

(56) References Cited

U.S. PATENT DOCUMENTS

| | | |
|---|---|---|
| 2016/0226879 A1 | 8/2016 | Chan et al. |
| 2016/0261581 A1 | 9/2016 | Wang et al. |
| 2016/0321652 A1 | 11/2016 | Dimmick et al. |
| 2017/0163629 A1* | 6/2017 | Law .................... H04L 63/0823 |
| 2018/0183594 A1 | 6/2018 | Palanisamy |

FOREIGN PATENT DOCUMENTS

| | | |
|---|---|---|
| CN | 109074582 A | 12/2018 |
| CN | 110226177 A | 9/2019 |

OTHER PUBLICATIONS

Application No. CN202080086931.1, Office Action, Mailed on Nov. 2, 2023, 22 pages.
Application No. PCT/US2020/066462, International Search Report and Written Opinion, Mailed on Apr. 19, 2021, 11 pages.
Application No. CN202080086931.1, Office Action, Mailed on Jun. 21, 2024, 14 pages.
EP20902443.9, "Intention to Grant", Jun. 18, 2024, 7 pages.

* cited by examiner

METHOD AND SYSTEM FOR TOKEN GATEWAY

CROSS-REFERENCE TO RELATED APPLICATIONS

This application claims the benefit of the filing date of U.S. Provisional Application No. 62/951,997, filed on Dec. 20, 2019, and U.S. Provisional Application No. 62/969,454, filed on Feb. 3, 2020. These applications are incorporated by reference in their entirety for all purposes.

BACKGROUND

Access tokens (e.g., payment tokens) can be used to access resources such as goods and services, secure locations, and secure data. An access token can be a substitute for a real credential. The use of an access token protects the real credential, since the real credential is not stored or transmitted in places where fraudulent entities e.g., hackers can have access.

In some access token systems, a token requestor (e.g., a mobile phone) can request a token from a token service provider. However, a token requestor may interact with many different token service providers since the token requestor may have many accounts. This requires that the token requestor interact with each token service provider to obtain token. If the token requestor has ten tokenized accounts, then the token requestor would have to interact with token service providers using ten different APIs or interfaces. If there are thousands of token requestors, the update and maintenance of all of those connections and interfaces can be burdensome.

More specifically, in today's day and age, users use multiple channels to transact and business entities offer seamless, multi-channel commerce experiences through mobile devices, mobile applications, web browsers, and Internet of Things (IoT) devices. Thus, to use tokens as surrogates for real payment credentials would require the consumers to manage secure communications with each token service provider associated with a specific transaction channel. Moreover, the consumer devices would be required to implement a specific integration with each connected token service provider. Such a tokenization scheme is not flexible and/or scalable.

In addition, each token requestor can only interact with one token service provider at a time. This is limiting, and can be problematic for a token requestor. For example, if a particular token service provider is temporarily inoperative or slow, then this can make it difficult for the token requestor conduct transactions.

Accordingly, improved tokenization systems and methods are needed. Embodiments of the invention address these and other problems, individually and collectively.

BRIEF SUMMARY

By one embodiment, there is provided a method. The method includes receiving, by a token gateway, a first request message from a token requestor computer. The token gateway determines at least one token service computer from a plurality of token service computers, each token service computer in the plurality of token service computers operating independently of each other. The token gateway transmits at least one second request message to the at least one token service computer and receives, at least one first response message comprising at least one token and/or supplemental data associated with the at least one token from the at least one token service computer. The token gateway transmits a second response message to the token requestor computer, the second response message comprising the at least one token and/or the supplemental data.

Another embodiment provides for a token gateway computer. The token gateway computer comprises a processor and a non-transitory computer readable medium coupled to the processor, the computer readable medium comprising code, executable by the processor, for implementing a method comprising: receiving a first request message from a token requestor computer; determining at least one token service computer from a plurality of token service computers, each token service computer in the plurality of token service computers operating independently of each other; transmitting at least one second request message to the at least one token service computer; receiving at least one first response message comprising at least one token and/or supplemental data associated with the at least one token from the at least one token service computer; and transmitting, a second response message to the token requestor, the second response message comprising the at least one token and/or the supplemental data.

Another embodiment includes a method comprising: receiving, from a token gateway, a first request message for a token, the first request message being sent to the token gateway from a token requestor computer; transmitting to an authorizing computer, a second request message to verify a user associated with the token requestor computer; generating, in response to receiving a successful verification message from the authorizing computer, at least one token and/or supplemental data associated with the at least one token; and transmitting the at least one token and/or supplemental data associated with the at least one token to the token gateway.

These and other embodiments are described in further detail below, with reference to the Figures and Detailed Description.

DETAILED DESCRIPTION

Figure 1:
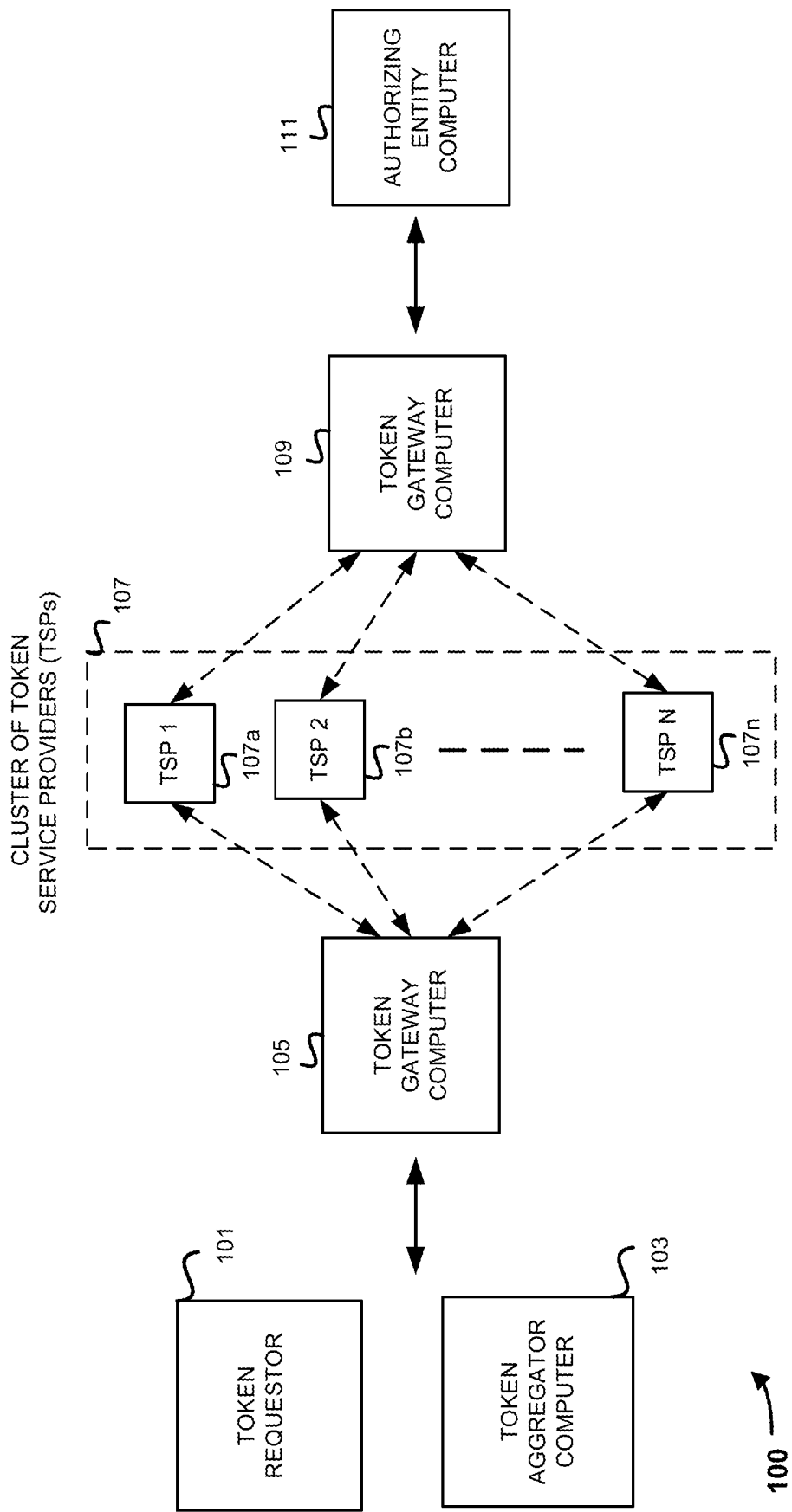
FIG. 1 shows a block diagram of a token system according to an embodiment.

Embodiments of the present disclosure provide for a token gateway computer that provides for a managed service allowing token service providers and authorization systems to manage issuance and distribution of digital token credentials. The token gateway computer provides a flexible and scalable manner to securely provision, process, and manage token credentials with token requestors across a number of use cases. Such capabilities may be made available and complemented through a common set of interfaces between the token gateway computer and different entities involved in the tokenization system i.e., token requestors, token aggregators, and token service providers.

The token gateway computer can be utilized to enable multiple digital payment use cases such as contactless transactions, quick-response (QR) code transactions, e-commerce transactions, card-on-file transactions, automated clearing house (ACH), real time payments (RTP), and IoT device based payment transactions. Tokenization limits the exposure of account data and mitigates the fraud risk for transactions occurring in the payment ecosystem. Users may benefit from new and more secure ways to conduct transaction, improved transaction approval levels, and reduce risk of subsequent fraud in the event of a data breach in which payment tokens can be exposed instead of underlying personal and private information of the users (e.g., personal account numbers). Further, service providing entities may experience a reduced threat of attacks and data breaches as tokens become less appealing targets for fraud, given their limitation to a specific domain. Moreover, authorizing entities e.g., financial institutions can also benefit from improved authorization rates due to higher assurance levels offered by tokens.

Before discussing detailed embodiments of the invention, some descriptions of certain terms may be useful.

A "resource provider" may be an entity that can provide a resource such as goods, services, information, and/or access to a location (e.g., a parking space, a transit terminal, etc.). Examples of resource providers include merchants, governmental authorities, secure data providers, etc. A resource provider may operate one or more resource provider computers.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorization computer" or "authorizing entity computer" may include any system involved in authorization of a transaction. The authorization computer may determine whether a transaction can be authorized and may generate an authorization response message including an authorization status (also may be known as an authorization decision). In some embodiments, an authorization computer may be a payment account issuer computer. In some cases, the authorization computer may store contact information of one or more users. In other embodiments, the authorization computer may authorize non-financial transactions involving a user. For example, the authorization computer may make an authorization decision regarding whether the user can access a certain resource. In some cases, the authorization computer may be a content provider server computer associated with a content providing entity, which manages one or more resources that may be accessed by a user. The authorization computer may be known as an authorizing entity computer. The authorization computer may include an "access control server" that may be configured to authenticate a user.

An "authorization request message" may be an electronic message that requests authorization for a transaction. In some embodiments, it is sent to a payment processing network and/or an issuer of a payment account to request authorization for a payment transaction. An authorization request message according to some embodiments may comply with ISO 8583, which is a standard for systems that exchange electronic transaction information associated with a payment made by a consumer using a payment device or a payment account. An authorization request message may also comprise additional data elements corresponding to "identification information" including, for example, a service code, a CVV (card verification value), a dCVV (dynamic card verification value), an expiration date, etc. An authorization request message may also comprise "transaction data," such as any information associated with a current transaction (e.g., the transaction amount, merchant identifier, merchant location, etc.), as well as any other information that may be utilized in determining whether to identify and/or authorize a payment transaction.

An "authorization response message" may be reply to an authorization request message. In some embodiments, an authorization response message may be an electronic message reply to an authorization request message generated by an issuing financial institution (i.e. issuer) or a payment processing network. An authorization response message according to some embodiments may comply with ISO 8583, which is a standard for systems that exchange electronic transaction information associated with a payment made by a consumer using a payment device or a payment account. The authorization response message may include an authorization code, which may be a code that an account issuing bank returns in response to an authorization request message in an electronic message (either directly or through the payment processing network) to a merchant's access device (e.g., point of sale terminal) that indicates approval of the transaction. The code may serve as proof of authorization. As noted above, in some embodiments, a payment processing network may generate and/or forward the authorization response message to the merchant.

A "credential" may be any suitable information that serves as reliable evidence of worth, ownership, identity, or authority. A credential may be a string of numbers, letters, or any other suitable characters that may be present or contained in any object or document that can serve as confirmation.

A "value credential" may be information associated with worth. Examples of value credentials include payment credentials, coupon identifiers, information needed to obtain a promotional offer, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

A "token" may be a substitute value for a credential. A token may be a string of numbers, letters, or any other suitable characters. Examples of tokens include access tokens such as payment tokens, data that can be used to access secure systems or locations, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which sensitive data is replaced with substitute data. For example, a real credential (e.g., a primary account number (PAN)) may be tokenized by replacing the real account identifier with a substitute number that may be associated with the real credential. Further, tokenization can be applied to any other information to substitute the underlying information with a token. "Token exchange" or "de-tokenization" can be a process of restoring the data that was substituted during tokenization. For example, a token exchange may include replacing a payment token with its associated primary account number (PAN). Further, de-tokenization or token exchange may be applied to any other information to retrieve the substituted information from a token. In some embodiments, token exchange can be achieved via a transactional message, such as an ISO message, an application programming interface (API), or another type of web interface (e.g., web request).

A "token issuer", "token service provider", "token service computer", "token service system" can include a system that services tokens. In some embodiments, a token service computer can facilitate requesting, determining (e.g., generating) and/or issuing tokens, as well as maintaining an established mapping of tokens to primary account numbers (PANs) in a repository (e.g. token vault). In some embodiments, the token service computer may establish a token assurance level for a given token to indicate the confidence level of the token to PAN binding. The token service computer may include or be in communication with a token vault where the generated tokens are stored. The token service computer may support token processing of payment transactions submitted using tokens by de-tokenizing the token to obtain the actual PAN. A token service provider may be responsible for a number of discrete functions which can include token provisioning, domain controls, processing, and lifecycle management of tokens.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service computer that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

A "token requestor" or "a token requestor computer" can be a registered entity that requests tokens from a token service provider. Examples of token requestors include third party wallet providers, authorization entities (e.g., financial institutions) offering mobile or web applications, merchants, e-commerce enablers, bill payment entities, treasury payment initiators and the like. By dome embodiments, in order to request tokens, a token requestor may connect with a token gateway computer either directly or via a token aggregator. A token requestor may be assigned multiple token requestor IDs to support token domain restriction controls for each associated usage scenario. Token requestors may register and comply with participation requirements.

A "token aggregator" can be an entity that is authorized to integrate with the token gateway computer to perform token related activities on behalf of one or more token requestors. The token aggregator may perform payment token related activities such as token provisioning, cryptogram requests, and lifecycle management of tokens. By some embodiments, payment gateways, payment service providers and third-party providers can play the role of token aggregator.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as an time duration as measured from the time of issuance.

A "token request message" may be an electronic message for requesting a token. A token request message may include information usable for identifying a payment account or digital wallet, and/or information for generating a payment token. For example, a token request message may include payment credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key).

A "token response message" may be a message that responds to a token request. A token response message may include an indication that a token request was approved or denied. A token response message may also include a payment token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key).

A "token requestor identifier" may include any characters, numerals, or other identifiers associated with an entity associated with a network token system. For example, a token requestor identifier may be associated with an entity that is registered with the network token system. In some embodiments, a unique token requestor identifier may be assigned for each domain for a token request associated with the same token requestor. For example, a token requestor identifier can identify a pairing of a token requestor (e.g., a mobile device, a mobile wallet provider, etc.) with a token domain (e.g., e-commerce, contactless, etc.). A token requestor identifier may include any format or type of information. For example, in one embodiment, the token requestor identifier may include a numerical value such as a ten digit or an eleven digit number (e.g., 4678012345).

A "cryptogram" may include a piece of obscured text such as encrypted text. A cryptogram may be formed by encrypting input data with an encryption key such as a symmetric encryption key. In some embodiments, a cryptogram is also reversible so that the inputs that are used to form the cryptogram can be obtained using the same symmetric key to perform a decryption process. In some embodiments, if input data is encrypted using a private key of a public/private key pair, the cryptogram may also be a digital signature. A digital signature may be verified with a public key of the public/private key pair. In some embodiments, a cryptogram may include a dCVV i.e., a dynamic card verification value.

In some embodiments, a cryptogram can be generated in any suitable manner. In some embodiments, the input to the cryptogram can include data elements including an account identifier such as a primary account number, and a variable data element such as a counter, a time of day, etc. Such data may be included using an encryption process such as DES (data encryption standard), triple-DES, or AES (advanced encryption standard) using any suitable encryption keys. The cryptogram may be verified by another computer such as remote computer by either decrypting the cryptogram and verifying the decrypted contents with other data (e.g., an account number stored on file), or by encrypting other inputs and then comparing the encrypted result to the cryptogram.

A "user" may include an individual. In some embodiments, a user may be associated with one or more personal accounts and/or user devices.

A "user device" or "a mobile communication device" may comprise any suitable electronic device that may be transported and operated by a user, which may also optionally provide remote communication capabilities to a network. Examples of remote communication capabilities include using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile communication devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile communication device may comprise any suitable hardware and software for performing such functions, and may also include multiple devices or components (e.g. when a device has remote access to a network by tethering to another device—i.e. using the other device as a modem—both devices taken together may be considered a single mobile communication device).

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

FIG. 1 shows a block diagram of a token provisioning system according to an embodiment. The token provisioning system 100 includes a token requestor 101, a token aggregator 103, a first token gateway computer 105, a cluster of token service providers 107, a second token gateway computer 109, and an authorizing entity computer 111.

The first token gateway computer 105 forms an interface between the token requestor 101 and/or the token aggregator 103 and the cluster of token service providers 107, whereas the second token gateway computer 109 forms an interface between the cluster of token service providers 107 and the authorizing entity computer 111. The cluster of token service providers includes a plurality of token service providers 107a, 107b, . . . 107n. Each of the plurality of token service providers may operate a token service computer that is configured to generate and provide tokens to the token requestor/aggregators independently of each other. Specifically, each of the token service computers may implement a unique protocol to communicate with the token gateway computer, and implement a different set of rules that govern the process of generating tokens.

The first token gateway computer 105 is configured to receive token request messages (e.g., a first request message) from the token requestor 101 and/or the token aggregator 103, and route the token request message to one or more token service computers within the cluster of token service providers 107. As will be described later, the first request message may be one of a token provisioning request message and a cryptogram request message. In this manner, the first token gateway computer 105 provisions for the token requestor 101 (or the aggregator 103) to communicate with the cluster of token service providers 107, without requiring the token requestor 101 to implement a specific integration with each of the token service computers that it communicates with.

By some embodiments, the token request message includes data elements associated with the token requestor 101. Upon receiving the token request message, the first token gateway computer 105 may extract the token requestor data elements and route the token request to one or more token service computers (within the cluster 107) based on the extracted data elements. By some embodiments, requests transmitted to the token gateway computer 105 may be routed to one or more token service computes within the cluster based on a service configuration. The service configuration relates the token requestor to a domain. Specifically, the domain ties the token requestor to tokenization rules, which comprise of a collection of restriction sets that define conditions that apply to the request and use of the token. Details pertaining to the routing of token request messages performed by the first token gateway computer 105 are described later with reference to FIG. 2.

By one embodiment, the first token gateway computer 105 may be configured to support a number of use cases for card-based and account based tokens. Card based tokens may be device bound or non-device bound. Device bound tokens may be restricted and bound to a specific device and may require additional verification of the account holder's identity by an authorizing entity. Transactional communications using device bound tokens may include NFC mobile contactless payments, in-app e-commerce payments, IoT devices such as wearable, home automation, etc., merchant presented QR code transactions, consumer presented QR code transactions and the like. In contrast, non-device bound tokens are not restricted to a specific device but may be restricted to a specific merchant. Examples of transactions using non-device bound tokens may include transactions initiated by secure remote commerce and e-commerce enablers, merchants storing tokens instead of account holders PAN in their payment systems and the like. Account based tokens may be restricted to a specific device, specific merchant, or counterparty. Examples of transactions based on account based tokens may include ACH payments, RTP payments and the like.

Upon the one or more token service computers i.e., the token service providers within the cluster of token service providers 107 receiving the token request message, each of the one or more token service computers may initiate an identity and verification process. The identity and verification process enables verification than an actual accountholder has authorized a token requestor 101 and/or the token aggregator 103 to initiate the token request process.

As shown in FIG. 1, each of the token service providers 107a, 107b, . . . 107n may communicate, via the second token gateway computer 109 with the authorizing entity computer 111 in order to perform the identity and verification process. For instance, a particular token service provider e.g., 107a may communicate with the authorizing entity computer 111 to confirm and verify information about an account and/or an accountholder. The second token gateway computer 109 may be configured to receive an verification response message from the authorizing entity computer 111, where after the second token gateway computer 109 may forward the verification response message to the particular token service provider. In turn, the particular token service provider may generate the requested token and forward the generated token to the first token gateway computer 105, which in turn forwards the generated token to the token requestor 101.

By some embodiments, the authorizing entity computer 111 may utilize several mechanisms to perform the above stated identify and verification process. For example, in one instance, the authorizing entity computer 111 may provide a telephone number that can be displayed in an user interface of the token requestor. The accountholder i.e., the user may be instructed to contact the authorization entity to complete the verification process. In another example, a one-time password (OTP) mechanism may be utilized to verify the identity of the account holder. An OTP may be generated by the token service computer and transmitted to the authorizing entity computer 111. The authorizing entity computer 111 may send the OTP to the accountholder using tenured communication methods such as email or SMS messages to a mobile device operated by the user. Following receipt, the accountholder may enter the OTP in an user interface of the token requestor, which in turn forwards the OTP to the token service computer. The token service computer may determine whether the received OTP matches the OTP that was initially generated. Upon determining a successful match, the token service computer may generate and transmit the token to the token requestor.

By some embodiments, the authorizing entity computer 111 may transmit accountholder credentials for provisioning purposes to a token requestor 101. For instance, when an account holder initiates a token provision request from an application (of the authorizing entity installed on a device operated by the accountholder) or web-browser, the authorizing entity computer 111 transmits, via the second token gateway computer 109, the accountholder credentials to one or more token service providers 107. Upon successful validation, the one or more token service providers activate the token and transmit a message to the token requestor 101, via the first token gateway computer 105. It must be appreciated that although in the above description of the token system 100 of FIG. 1, a first token gateway computer 105 and a second token gateway computer 109 are depicted as separate entities, the token system 100 may include only a single token gateway computer which is configured to perform the functions of both, first token gateway computer 105 and the second token gateway computer 109.

Figure 2:
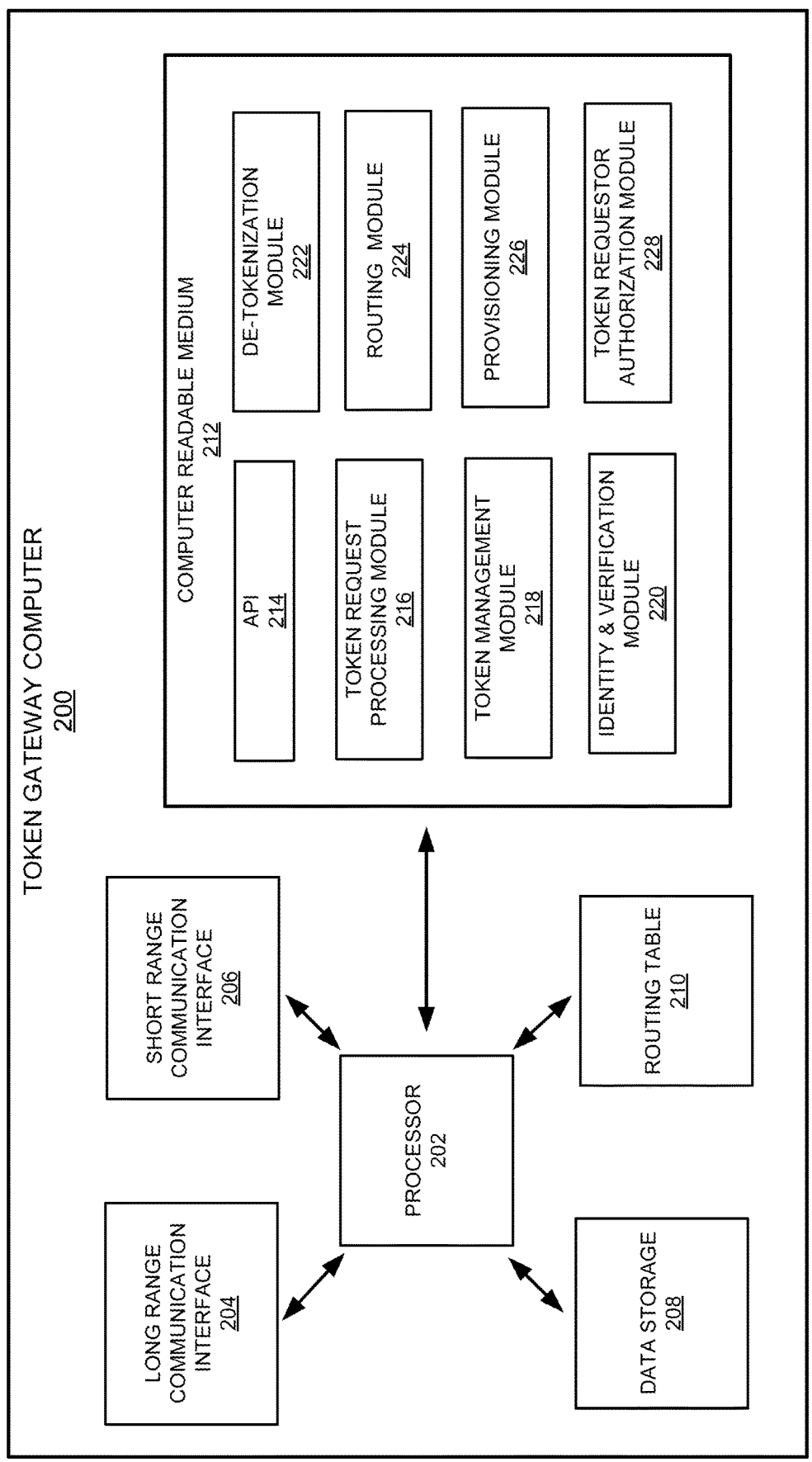
FIG. 2 shows a block diagram of a token gateway computer according to an embodiment.

FIG. 2 shows a block diagram showing components in an exemplary token gateway computer 200. The token gateway computer 200 may comprise a processor 202. It may also comprise a computer readable medium 212, a short range communication interface 206, a long range communication interface 204, a data storage 208, and a routing table 210 operationally coupled to the processor 202.

The computer readable medium 212 may store code or instructions for allowing token gateway computer 200 to operate in the manner as described herein. The instructions may be executed by the processor 202. For example, the computer readable medium 212 may comprise code or instructions for: forming a local data connection between a token requestor and a plurality of token service provider computers; receiving a token request message from the token requestor and directing the received token request message to one or more token service provider computers; and automatically providing, a resource (e.g., at least one token) to the token requestor, upon receiving the resource from the one or more token service provider computers. In some embodiments, the token gateway computer 200 may receive (from the one or more token service provider computers) supplemental data associated with the at least one token and forward the supplemental data to the token requestor. Supplemental data may comprise of a cryptogram that limits an interaction channel of the corresponding token.

The computer readable medium 212 may further comprises an API module 214, a token request processing module 216, a token management module 218, an identity and verification module 220, a de-tokenization module 222, a routing module 224, a provisioning module 226, and a token requestor authorization module 228. The API module 214 may comprise software which allows the token gateway computer 200 to communicate with an external computer.

The token requestor processing module 216 may comprise software which enables the token gateway computer 200 to receive a token request message from a token requestor and/or a token aggregator, and extract data elements associated with the token requestor that are included in the token request message. By some embodiments, the data elements associated with the token requestor may include a token requestor identifier, a real credential such as a PAN, identity data, or the like.

The provisioning module 226 may comprise software which enables the token gateway computer 200 to process the data elements extracted from the token request message by the token requestor processing module 216. Specifically, the provisioning module 226 may enable the token gateway computer 200 to determine one or more token service provider computers to whom the token request message is to be forwarded. By one embodiment, the provisioning module 226 activates the routing module 224, which comprise software to determine one or more token service provider computers to whom the token request message is to be routed. The routing module 224 accesses the routing table 210 which stores mapping information. Mapping information may include information that maps token requestor data elements to identifiers of token service provider computers. In this manner, the routing module 224 may forward a given input token request message to one or more token service provider computers. Upon receiving tokens (and supplemental data associated with the tokens), the token provisioning module 226 may forward the received tokens and supplemental data to the token requestor.

The identity and verification module 220 may include software which enables the token gateway computer 200 to perform a verification process. Specifically, as described previously, the identity and verification module 220 may perform a verification process to determine that an actual account holder has authorized the token requestor to initiate the token request message.

The token requestor authorization module 228 may include software which enables the token gateway computer 200 to authorize a token requestor and/or token aggregator. Specifically, the token requestor authorization module 228 may determine whether a particular token requestor and/or token aggregator is registered with the token system of FIG. 1 and is permitted to request tokens from the token service provider computer. It must be noted that a token requestor may be associated or linked to one or more domains for which the token requestor is permitted to request tokens. The token requestor authorization module 228 may determine whether a particular token requestor is requesting a token and/or supplemental data associated with the token (e.g., a cryptogram) in a permitted domain. The token gateway computer 200 may maintain information of the token requestors and token aggregators such as token requestor identifiers and the domain(s) in which a particular token requestor is permitted to request a token in the data storage 208.

The de-tokenization module 222 may include software that enables the token gateway computer 200 to receive and process token authorization request messages. For instance, in some embodiments, the de-tokenization module 222 upon receiving the token and/or cryptogram, may de-tokenize and validate the cryptogram with the token service provider computer associated with the generation of the cryptogram. Upon validation, the de-tokenization module 222 can notify an authorizing entity computer of whether or not the cryptogram is valid (i.e., is a correct cryptogram associated with an interaction channel).

The token management module 218 may comprise software which enables the token gateway computer 200 to perform token lifecycle management functionalities. The token lifecycle management functionalities may comprise several operations which can be token/account related. Such functionalities may be initiated by different entities (e.g., by the token service provider computer at the request of the authorizing entity computer) and facilitated via the API module 214 of the token gateway computer 200. Specifically, the token gateway computer 200 allows a token requestor to conduct token lifecycle management through a token requestor API included in the API module 214. Additionally, authorizing entity computer can initiate token lifecycle management through the authorizing entity computer's API included in the API module 214.

By some embodiments, the token gateway computer 200 may support the following lifecycle management events for tokens:

Activate—as some token types may be pre-provisioned before accountholder verification is successfully completed, the activate functionality allows an authorizing entity computer to notify the token service provider computer to activate the token after the accountholder has been validated. A token may be active before any payment transaction can occur.

Delete—The authorizing entity computer may initiate a delete functionality on behalf of a consumer (e.g., lost device) or for internal risk and customer protection reasons (e.g., account compromised). Such an action terminates the token-to-account mapping in the token service provider computer. The accountholder may delete a token directly through the user interface of the token requestor. The token requestor may initiates the delete functionality on behalf of the accountholder, and the authorizing computer may receive notification that the token has been deleted.

Suspend—The authorizing entity computer may initiate a suspend action to temporarily deactivate the token (e.g., consumer traveling, suspicious activity). In some embodiments, the token requestor may also initiate the suspend functionality based on internal service interaction.

Resume—The authorizing computer may initiate a resume functionality of the token (following a SUSPEND event) so existing account parameters can be enabled for payment and replenishment.

Update Account—When an underlying account associated with an active token can be changed by the authorizing computer, it may notify the token service provider computer about the new account information. The token service provider computer may then update the token-to-account mapping maintained in a vault. This allows the new account to be mapped to an existing token, which eliminates the need for the accountholder to delete and re-provision the active token.

Figure 3:
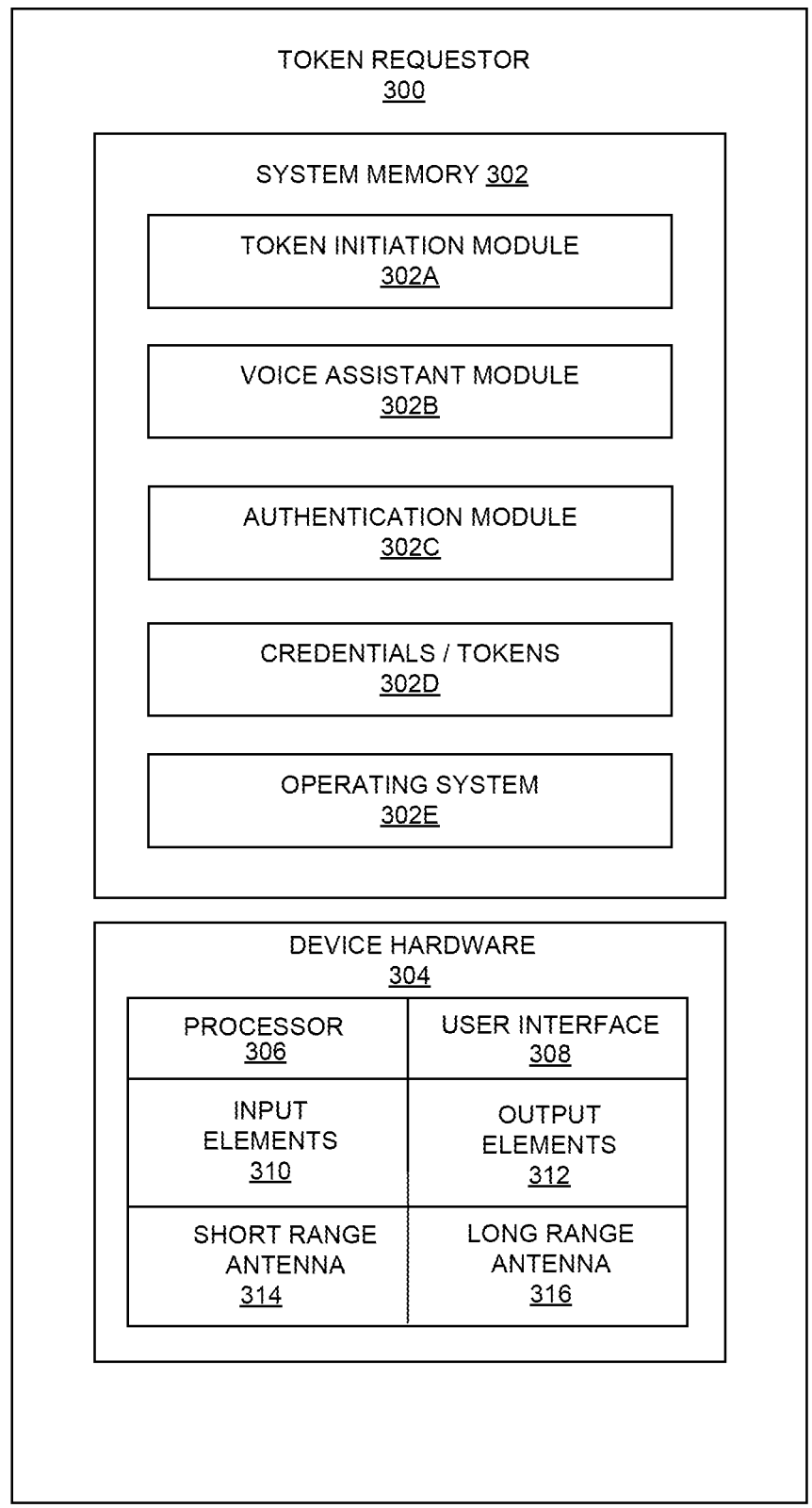
FIG. 3 shows a block diagram of a token requestor according to an embodiment.

Turning now to FIG. 3, there is illustrated a token requestor device 300 according to an embodiment. Token requestor device 300 may include device hardware 304 coupled to a system memory 302.

Device hardware 304 may include a processor 306, a short range antenna 314, a long range antenna 316, input elements 310, a user interface 308, and output elements 312 (which may be part of the user interface 308). Examples of input elements may include microphones, keypads, touchscreens, sensors, etc. Examples of output elements may include speakers, display screens, and tactile devices. The processor 306 can be implemented as one or more integrated circuits (e.g., one or more single core or multicore microprocessors and/or microcontrollers), and is used to control the operation of the token requestor device 300. The processor 306 can execute a variety of programs in response to program code or computer-readable code stored in the system memory 302, and can maintain multiple concurrently executing programs or processes.

The long range antenna 316 may include one or more RF transceivers and/or connectors that can be used by token requestor device 300 to communicate with other devices and/or to connect with external networks. The user interface 308 can include any combination of input and output elements to allow a user to interact with and invoke the functionalities of token requestor device 300. The short range antenna 314 may be configured to communicate with external entities through a short range communication medium (e.g. using Bluetooth, Wi-Fi, infrared, NFC, etc.). The long range antenna 316 may be configured to communicate with a remote base station and a remote cellular or data network, over the air.

The system memory 302 can be implemented using any combination of any number of non-volatile memories (e.g., flash memory) and volatile memories (e.g. DRAM, SRAM), or any other non-transitory storage medium, or a combination thereof media. The system memory 302 may store computer code, executable by the processor 306, for performing any of the functions described herein. For example, the system memory 302 may comprise a computer readable medium comprising code, executable by the processor 306, for transmitting a token request message to a token gateway computer.

The system memory 302 may also store a token initiation module 302A, a voice assistant module 302B, an authentication module 302C, credentials 302D, and an operating system 302E. The token initiation module 302A may include instructions or code initiating and transmitting a token request message with an external device such as token gateway computer. It may include code, executable by the processor 306, for generating and transmitting other request messages, as well as receiving and forwarding response messages received from the token gateway computer or other devices. It may also include code, executable by the processor 306, for forming a local connection or otherwise interacting with an external access device. The voice assistant module 302B may comprise code, executable by the processor 306, to receive voice segments, and generate and analyze data corresponding to the voice segments. The authentication module 302C may comprise code, executable by the processor 306, to authenticate a user operating the token requestor device 300. This can be performed using user secrets (e.g., passwords) or user biometric information.

System memory 302 may also store credentials and/or tokens 302D. Credentials may also include information identifying the token requestor device 300 and/or the user of the token requestor device 300. Examples of credentials may include a public key associated with the token requestor device 300 and/or a user of the token requestor device 300, a digital signature (e.g., the public key of the token requestor device 300 signed by a key of the authentication system), payment credentials, biometric data (e.g., biometric samples or templates), etc.

Figure 4:
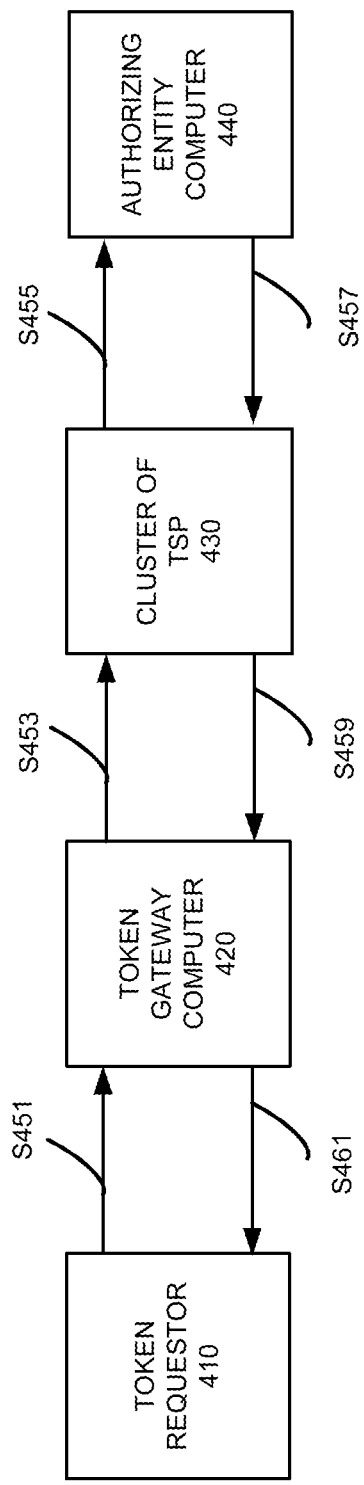
FIG. 4 shows a process flow for a token provisioning system according to an embodiment.

FIG. 4 depicts a process flow for a token provisioning system according to an embodiment. The process commences in step S451, wherein a token request message (e.g., a first token request message, a token provisioning request message) is transmitted by a token requestor 410 to a token gateway computer 420. In step S453, the token gateway computer 420 routes the token request message to one or more token service computers included in a cluster of token service provider computers 430. By some embodiments, the token gateway computer transmits a second request message to at least one token service provider computer. As described previously with reference to FIG. 2, the token gateway computer 420 may access a routing table, which maps token requestor data elements (included in the token request message) to token service provider computers.

The process then moves to step S455, wherein the one or more token service provider computers of cluster 430 may perform an identity and verification process with an authorizing entity computer 440 to verify whether an actual accountholder has authorized the token requestor 410 to initiate the token generation request. In step S457, the one or more token service provider computers may receive a successful verification response message from the authorizing entity computer 440. Note that the authorizing entity computer 440 may utilize a variety of means (described above with reference to FIG. 1) to verify the accountholder.

The process thereafter proceeds to step S459, where the one or more token service provider computers generate one or more tokens and transmit the generated tokens to the token gateway computer 420. In other words, the token gateway computer 420 receives a first response message comprising at least one token from the at least one token service provider computer. In step S461, the token gateway computer 420 transmits the received tokens to the token requestor 410 i.e., the token gateway computer transmits a second response message to the token requestor 410, wherein the second response message includes the at least one token and/or additional information. In some embodiments, token service provider computers may generate additional/supplemental data associated with each of the one or more tokens. For instance, the token service provider computers may generate supplemental data including a cryptogram which limits an interaction channel for a corresponding token. In such cases, the supplemental data may be generated by the token service provider computers (in step S459) and transmitted to the token requestor 410 in step S461 along with the token.

Figure 5:
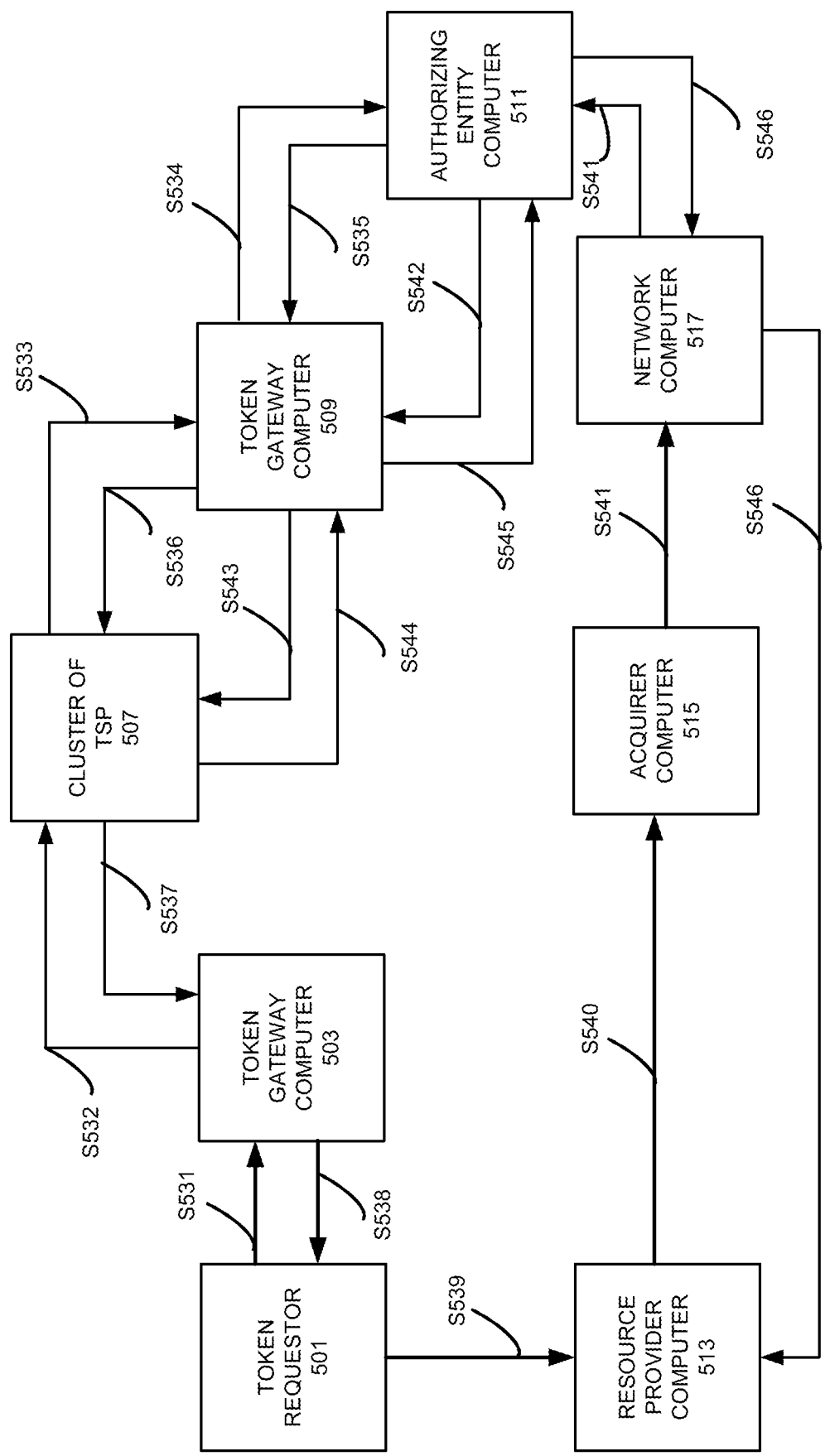
FIG. 5 shows a block diagram of a system with a process flow illustrating an online interaction according to an embodiment.

FIG. 5 shows a block diagram of a system with a process flow illustrating an online interaction according to an embodiment. The process flow as depicted in FIG. 5 can correspond to an e-commerce type transaction or a card-on-file type transaction. It is noted, however, that the flow in FIG. 5 could also correspond to a device present transaction, where the token requestor is a user device operated by a user and the resource provider computer is an access device (e.g., a POS terminal or gate terminal) at a location of a resource provider (e.g., a merchant or a transit agency).

A first step of conducting an online transaction may include requesting a token cryptogram from a token gateway computer to conduct the transaction with the token. Further, the token gateway computer may be accessed to retrieve a payment bundle for processing the transaction. According to some embodiments, the payment bundle may comprise a payment cryptogram generated by one or more token service provider computers for a specific transaction.

As shown in FIG. 5, a token requestor 501 transmits a request (e.g., a first request message i.e., a cryptogram request message) for a token cryptogram to a token gateway computer 503 in step S531. The request may include a token that would be associated with the token cryptogram. In step S532, the token gateway computer 503 routes the request to one or more token service provider computers (included in a cluster of token service provider computers 507) requesting an interaction specific cryptogram. In other words, the token gateway computer 503 transmits a second request message to at least one token service provider computer. By some embodiments, the token gateway computer 503 determines at least one token service provider computer (to whom the request is to be forwarded) by accessing a routing table that maps data elements (e.g., token requestor ID) of the token requestor which are included in the request to one or more token service provider computers.

In some embodiments, the token requestor 501 can transmit a single request to the token gateway computer 508 and that request may include multiple tokens. The token gateway computer 508 can then transmit multiple cryptogram request messages to multiple token service provider computers 507 in parallel or sequentially. This can be beneficial in the event that one or more token service provider computers 507 are slow or inoperative. In some embodiments, the token gateway computer 508 may include a timer which can send token cryptogram request messages to one token service provider computer at a time. If one does not respond by the timer deadline, then the token gateway computer 503 can communicate with the next token service provider computer, and so on.

Upon the one or more token service provider computers 507 receiving the request for the interaction specific cryptogram, the one or more token service provider computers 507 initiate an identity and verification process. Specifically, the one or more token service provider computers transmit a verification request message to a token gateway computer 509 (step S533). The token gateway computer 509 communicates with an authorizing entity computer 511 (step S534) to verify that an actual account holder has authorized the token requestor 501 to initiate the token request. As described previously, the authorizing entity computer 511 can utilize a plurality of mechanisms (e.g., one-time passwords, email, text message, etc.) to verify the account holder. In step S535, the authorizing entity computer 511 transmits a verification response message to the token gateway computer 509 indicating whether the accountholder has been successfully verified. In step S536, the token gateway computer 509 forwards the verification response message to the one or more token service provider computers 507.

In step S537, upon receiving the verification response message indicating that the accountholder has been successfully verified, the one or more token service provider computers 507 generate an interaction specific cryptogram and provide the token along with the cryptogram to the token gateway computer 503. Specifically, the token gateway computer 503 receives at least one first response message which comprises at least one token and/or supplemental data associated with the token. Further, in step S538, the token gateway computer 503 forwards the token along with the cryptogram to the token requestor 501 i.e., i.e., the token gateway computer 503 transmits a second response message to the token requestor 410, wherein the second response message includes the at least one token and/or cryptogram.

Although steps S531-S538 describe the retrieval of a token cryptogram, it is understood that those steps are not limited thereto. In other embodiments, a token or both the token and the cryptogram can be retrieved from the token service provider computers after the token requestor computer provides a real credential such as a primary account number.

Upon obtaining the interaction specific cryptogram from the token gateway computer 503, the token requestor 501 can at any suitable point in time thereafter, transmit the token (e.g., a token payload) and the cryptogram to a resource provider computer 513 e.g., a merchant computer (step S539). Thereafter, in step S540, the resource provider computer 513 generates an authorization request message in order to validate the cryptogram. For instance, the resource provider computer 513 generates the authorization request message that includes the token, and transmits the generated authorization request message to an acquirer computer 515 (e.g., an issuer computer).

The acquirer computer 515 provides the authorization request message to a network computer 517 (step S541). The network computer 517 may be a payment processing network computer. The payment processing network computer 517 may include data processing subsystems, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions.

In some embodiments, the network computer 517 may forward the authorization request message to the authorizing entity computer 511 in step S541. In order to validate the cryptogram, the authorizing entity computer 511 forwards the authorization request to the token gateway computer 509 (step S542). Upon receiving the authorization request message, in step S543, the token gateway computer 509 can de-tokenize and validate the cryptogram with the one or more token service provider computers 507 associated with the generation of the cryptogram.

Upon validation, the token gateway computer 509 may receive a response message from the one or more token service provider computers 507 indicating a status of the cryptogram verification i.e., whether or not the cryptogram is valid (step S544). In some embodiments, the one or more token service providers may be configured to verify a cryptogram based on a mapping table, which maps cryptograms to transaction related data e.g., transaction IDs, user IDs, etc. In step S545, the token gateway computer 509 forwards the message indicating the status of the cryptogram verification to the authorizing entity computer 511.

The authorizing entity computer 511 may determine whether or not to authorize the transaction i.e., interaction between a user and a resource provider based on criteria associated with the user's account. For example, the authorizing entity computer may determine that the user has sufficient funds in the account to complete the transaction. The authorizing entity computer 511 generates an authorization response message comprising for example, at least an indication of whether or not the interaction is authorized. In step S546, the authorization response message is transmitted by the authorizing entity computer 511 to the resource provider computer 513 via the network computer 517 so that the transaction can be completed.

It must be appreciated that although in the above description of the online interaction e.g., an e-commerce interaction between a user and a resource provider, a first token gateway computer 503 and a second token gateway computer 509 are depicted as separate entities, the online transaction system may include only a single token gateway computer which is configured to perform the functions of both the first token gateway computer 503 and the second token gateway computer 509. Moreover, by some embodiments, the network computer 517 i.e., the payment processing network computer can be directly connected to the cluster of token service provider computers 507. In this scenario, the network computer 517 can bypass the authorizing entity computer 511 and the token gateway computer 509 for purposes of validating the cryptogram. Additionally, it must be noted that although the above description of FIG. 5 relates to an online interaction of an e-commerce type transaction or a card-on-file type transaction, a similar mechanism of validating a cryptogram is applicable to a contactless interaction transaction. For example, a contactless transaction using a token provisioned to an NFC enabled device such as a phone or an IoT device may validate the cryptogram as described above (using at least steps S540 to S546) to complete the contactless transaction.

In some of the above described embodiments, data elements associated with a token requestor which are included in a token request message correspond to credentials such as PAN. Thereafter, as described above, a token and/or supplemental data associated with the token can be obtained to conduct transactions. It must be appreciated that the above described tokenization mechanisms can also be applied to an access system e.g., a building access system. In this scenario, the data elements included in the token request may correspond to identity data of a user. Thus, a user of a mobile device can implement the above described tokenization mechanisms using his/her identity data embedded in a token request. Upon communication and/or authorization from a token service provider computer, the user may be granted access to a building, restricted area, and the like.

Embodiments of the invention have a number of advantages. For example, referring to FIG. 1, a single token gateway computer 105 can communicate with many token service providers 107a-107n. Any routing functions or updates can be programmed into the token gateway computer 105, and each token service provider need not provide a separate connection to each token requestor or token aggregator. Stated differently, each token requestor only needs to be concerned with one connection to the token gateway computer, instead of managing multiple connections to the token service providers. Further, each token service provider need only be concerned about one connection to the token gateway computer, rather than being connected to each of the token requestors.

Further, conventional systems are not able to allow a token requestor to send a single token or cryptogram request message, and then communicate with many different token service providers in parallel sequentially. This allows the token requestor to receive the desired cryptogram or token as quickly as possible, or according to any preferences that might be desired by the token requestor (e.g., if one account is favored over another). It further allows the token requestor to still receive the desired token or token cryptogram if one of the token service providers is inoperative.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
receiving, by a first token gateway, a first request message requesting a token from a token requestor computer;
determining, by the first token gateway, a plurality of token service computers from a cluster of token service computers based on a service configuration information of the token requestor computer, each token service computer in the plurality of token service computers operating independently of each other;
transmitting, by the first token gateway, a plurality of second request messages to the plurality of token service computers, each second request message of the plurality of second request messages requesting the token;
receiving, by the first token gateway, at least one first response message comprising the token from the plurality of token service computers, wherein each token service computer of the plurality of token service computers is communicatively coupled, via a second token gateway to an authorizing computer that is configured to validate the token requestor computer; and
transmitting, by the first token gateway, a second response message to the token requestor computer, the second response message comprising the token, wherein the first token gateway is different than the second token gateway.

2. The method of claim 1, wherein the at least one first response message comprises supplemental data associated with the token, the supplemental data comprising a cryptogram that limits an interaction channel for a corresponding token.

3. The method of claim 1, wherein determining the plurality of token service computers comprises accessing a routing table that maps, token requestor data elements in the first request message to the plurality of token service computers.

4. The method of claim 3, wherein the token requestor data elements include token requestor identifiers.

5. The method of claim 3, wherein the token requestor data elements include a real credential.

6. The method of claim 1, wherein the second response message comprises the token and supplemental data associated with the token.

7. The method of claim 1, wherein the first request message is a provisioning request message.

8. The method of claim 1, wherein the first request message is a cryptogram request message.

9. A first token gateway computer comprising:
a processor; and
a non-transitory computer readable medium coupled to the processor, the computer readable medium comprising code, executable by the processor, for implementing a method comprising
receiving a first request message requesting a token from a token requestor computer;
determining a plurality of token service computers from a cluster of token service computers based on a service configuration information of the token requestor computer, each token service computer in the plurality of token service computers operating independently of each other;
transmitting a plurality of second request messages to the plurality of token service computers, each second request message of the plurality of second request messages requesting the token;

receiving at least one first response message comprising the token from the plurality of token service computers, wherein each token service computer of the plurality of token service computers is communicatively coupled, via a second token gateway computer to an authorizing computer that is configured to validate the token requestor computer; and transmitting, a second response message to the token requestor computer, the second response message comprising the token, wherein the first token gateway computer is different than the second token gateway computer.

10. The first token gateway computer of claim 9, wherein the at least one first response message comprises supplemental data associated with the token, the supplemental data comprising a cryptogram that limits an interaction channel for a corresponding token.

11. The first token gateway computer of claim 9, wherein determining the plurality of token service computers comprises accessing a routing table that maps, token requestor data elements in the first request message to the plurality of token service computers.

12. The first token gateway computer of claim 11, wherein the token requestor data elements include token requestor identifiers.

13. The first token gateway computer of claim 11, wherein the token requestor data elements include a real credential.

14. The first token gateway computer of claim 13, wherein the real credential is one of a primary account number and identity data of a user.

15. The first token gateway computer of claim 11, wherein the first request message is a cryptogram request message.

16. A method comprising:
receiving, from a first token gateway, a first request message for a token, the first request message being sent to the first token gateway from a token requestor computer;

transmitting, via a second token gateway, to an authorizing computer, a second request message to verify a user associated with the token requestor computer;

generating, in response to receiving a successful verification message from the authorizing computer via the second token gateway, at least one token and/or supplemental data associated with the at least one token; and transmitting the at least one token and/or supplemental data associated with the at least one token to the first token gateway, wherein the first token gateway is different than the second token gateway.

17. The method of claim 16, wherein the supplemental data comprises a cryptogram that limits an interaction channel for a corresponding token.

18. The method of claim 17, further comprising:
receiving, from the authorizing computer and via the second token gateway, a third request message for verifying an earlier generated cryptogram.

* * * * *